United States Patent
Cai et al.

(10) Patent No.: US 12,293,564 B2
(45) Date of Patent: May 6, 2025

(54) SKY DETERMINATION IN ENVIRONMENT DETECTION FOR MOBILE PLATFORMS, AND ASSOCIATED SYSTEMS AND METHODS

(71) Applicant: SHENZHEN ZHUOYU TECHNOLOGY CO., LTD., Shenzhen (CN)

(72) Inventors: Jianzhao Cai, Shenzhen (CN); You Zhou, Shenzhen (CN); Jiexi Du, Shenzhen (CN)

(73) Assignee: SHENZHEN ZHUOYU TECHNOLOGY CO., LTD., Shenzhen (CN)

( * ) Notice: Subject to any disclaimer, the term of this patent is extended or adjusted under 35 U.S.C. 154(b) by 729 days.

(21) Appl. No.: 17/325,123

(22) Filed: May 19, 2021

(65) Prior Publication Data

US 2021/0272289 A1 Sep. 2, 2021

Related U.S. Application Data

(63) Continuation of application No. PCT/CN2019/073748, filed on Jan. 29, 2019.

(51) Int. Cl.
*G06V 10/764* (2022.01)
*G06F 18/25* (2023.01)
(Continued)

(52) U.S. Cl.
CPC .......... *G06V 10/764* (2022.01); *G06F 18/251* (2023.01); *G06T 7/11* (2017.01);
(Continued)

(58) Field of Classification Search
CPC ... G06T 7/11; G06T 7/90; G06T 2207/30252; G06V 20/10; G06V 20/56; G06V 20/38;
(Continued)

(56) References Cited

U.S. PATENT DOCUMENTS

| 2010/0121577 A1 | 5/2010 | Zhang et al. |
| 2012/0070071 A1 | 3/2012 | Rankin et al. |
| 2016/0239977 A1* | 8/2016 | Komatsu ............ G06T 5/50 |

FOREIGN PATENT DOCUMENTS

| CN | 104848867 A | 8/2015 |
| CN | 105009169 A | 10/2015 |

(Continued)

OTHER PUBLICATIONS

International Search Report and Written Opinion issued the by the International Searching Authority in related International Application No. PCT/CN2019/073748, mailed Oct. 31, 2019 (7 pgs.).

(Continued)

*Primary Examiner* — Raphael Schwartz

(57) ABSTRACT

Identifying interfering features in the detection of an environment adjacent to a mobile platform, and associated systems and methods are disclosed herein. A representative method can include identifying candidate regions from a color image obtained by a color vision sensor carried by a mobile platform, filtering out a first region subset of regions based, at least in part, on non-image data obtained by a second sensor carried by the mobile platform, determining a second subset of regions as corresponding to an interfering feature based, at least in part, on color information, and performing environment detection based, at least in part, on the second subset of regions. Furthermore, the method can comprise transforming data corresponding to the subset of regions to integrate with non-color environment data obtained from another sensor carried by the mobile platform.

17 Claims, 12 Drawing Sheets
(5 of 12 Drawing Sheet(s) Filed in Color)

(51) Int. Cl.
*G06T 7/11* (2017.01)
*G06T 7/593* (2017.01)
*G06T 7/90* (2017.01)
*G06V 10/82* (2022.01)
*G06V 20/56* (2022.01)

(52) U.S. Cl.
CPC ............. *G06T 7/593* (2017.01); *G06T 7/90* (2017.01); *G06V 10/82* (2022.01); *G06V 20/56* (2022.01); *G06T 2207/10012* (2013.01); *G06T 2207/30252* (2013.01)

(58) Field of Classification Search
CPC ...... G06V 20/00; G06V 20/58; G06V 20/582; G06V 20/584; G06V 20/588; G06V 10/56; G06V 10/80; G06V 10/803; G06V 10/806; G06V 10/809; G06V 10/811; G06V 20/54; G06V 10/764
See application file for complete search history.

(56) References Cited

FOREIGN PATENT DOCUMENTS

| | | |
|---|---|---|
| CN | 106204572 A | 12/2016 |
| CN | 107318268 A | 11/2017 |
| CN | 108645409 A | 10/2018 |
| EP | 1 939 809 A1 | 7/2008 |
| WO | WO2007029454 A1 | 3/2007 |
| WO | WO2012037528 A2 | 3/2012 |
| WO | WO 2014/100741 A2 | 6/2014 |

OTHER PUBLICATIONS

Alberts Huang et al: "Finding Multiple Lanes in Urban Road Networks with Vision and Lidar", Autonomous Robots, Kluwer Academic Publishers, vol. 26, No. 2-3, Mar. 24, 2009 (Mar. 24, 2009), pp. 103-122, XP019670021, ISSN: 1573-7527.
The First Office Action dated Jul. 23, 2024 for Chinese Application No. 201980016415.9.

* cited by examiner

SKY DETERMINATION IN ENVIRONMENT DETECTION FOR MOBILE PLATFORMS, AND ASSOCIATED SYSTEMS AND METHODS

CROSS-REFERENCE TO RELATED APPLICATIONS

This application is a continuation of International Application No. PCT/CN2019/073748 filed Jan. 29, 2019, now pending, which is incorporated herein by reference in its entirety.

TECHNICAL FIELD

The presently disclosed technology is generally directed to determining and removing interfering features, such as the sky, for detecting an environment adjacent to a mobile platform.

BACKGROUND

The environment surrounding a mobile platform (e.g., an autonomous vehicle) can typically be scanned or otherwise detected using one or more sensors. For example, the mobile platform can be equipped with a stereo vision system (e.g., a "stereo camera") to sense its surrounding environment. A stereo camera is typically a type of camera with two or more lenses, each having a separate image sensor or film frame. When taking photos/videos with the two or more lenses at the same time but from different angles, the difference between the corresponding photos/videos provides a basis for calculating depth information (e.g., distance between objects in the scene and the stereo camera). As another example, the mobile platform can be equipped with one or more LiDAR sensors, which typically transmit a pulsed signal (e.g., laser signal) outwards, detect the pulsed signal reflections, and determine depth information about the environment to facilitate object detection and/or recognition. When equipped with Autonomous Driving or Advanced Driver Assistance System (ADAS) technology, a vehicle can drive itself under certain circumstances or at least sense the environment to assist the driver. There remains a need for more efficient and effective environment detection technologies.

SUMMARY

The following summary is provided for the convenience of the reader and identifies several representative embodiments of the disclosed technology.

In some embodiments, a computer-implemented method for environment sensing using one or more sensors carried by a mobile platform includes identifying a plurality of regions from a color image obtained by a color vision sensor carried by the mobile platform, and filtering out a first subset of regions from the plurality of regions to generate a revised set of regions based, at least in part, on non-image data obtained by a second sensor carried by the mobile platform. The method also includes determining a second subset of regions from the revised set of regions as corresponding to an interfering feature, based, at least in part, on color information associated with the revised set of regions, and performing environment detection based, at least in part, on the second subset of regions.

In some embodiments, the individual regions of the plurality of regions do not overlap with one another. In some embodiments, the entire color image is divided into the plurality of regions.

In some embodiments, identifying the plurality of regions is based, at least in part, on edge detection. In some embodiments, identifying the plurality of regions further comprises using at least one of Canny, Roberts cross, Sobel, or Prewitt methods.

In some embodiments, the color vision sensor includes a monocular color camera. In some embodiments, the second sensor includes an inertial measurement unit (IMU). In some embodiments, a relative position and/or orientation between the second sensor and the color vision sensor is fixed.

In some embodiments, filtering out the first subset of regions comprises determining a relationship between the interfering feature and a portion of the color image. In some embodiments, the portion of the color image at least partially overlaps with each region of the first subset of regions. In some embodiments, the relationship is defined, at least in part, by a line relative to the color image.

In some embodiments, the interfering feature is at least a threshold distance away from the mobile platform. In some embodiments, the interfering feature corresponds to the sky. In some embodiments, color associated with the interfering feature conforms to a particular type of color distribution.

In some embodiments, determining the second subset of regions is based, at least in part, on a measure of gradient. In some embodiments, the measurement of gradient is calculated based, at least in part, on color values.

In some embodiments, determining the second subset of regions comprises using at least one of a support vector machine (SVM) or an artificial neural network (ANN). In some embodiments, the second region subset comprises regions that are connected with one another.

In some embodiments, the method further comprises transforming data corresponding to the second subset of regions into detecting data obtained by a third sensor. In some embodiments, the third sensor produces three-dimensional (3D) sensor data. In some embodiments, the third sensor includes to a stereo camera. In some embodiments, performing environment detection is further based on sensor data obtained by the third sensor.

In some embodiments, the mobile platform includes at least one of an unmanned aerial vehicle (UAV), a manned aircraft, an autonomous vehicle, a self-balancing vehicle, a robot, a smart wearable device, a virtual reality (VR) head-mounted display, or an augmented reality (AR) head-mounted display.

Any of the foregoing methods can be implemented via a non-transitory computer-readable medium storing computer-executable instructions that, when executed, cause one or more processors associated with a mobile platform to perform corresponding actions, or via a vehicle including a programmed controller that at least partially controls one or more motions of the vehicle and that includes one or more processors configured to perform corresponding actions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 8A-1 and 8A-2 show a color image obtained by a camera and a corresponding silhouette image indicating sky regions identified from the color image, in accordance with some embodiments of the presently disclosed technology.

FIGS. 8B-1 and 8B-2 show a grayscale image obtained by a stereo vision system and a corresponding silhouette image indicating identified sky regions that are projected onto the grayscale image coordinate system.

DETAILED DESCRIPTION

1. Overview

Figure 1:
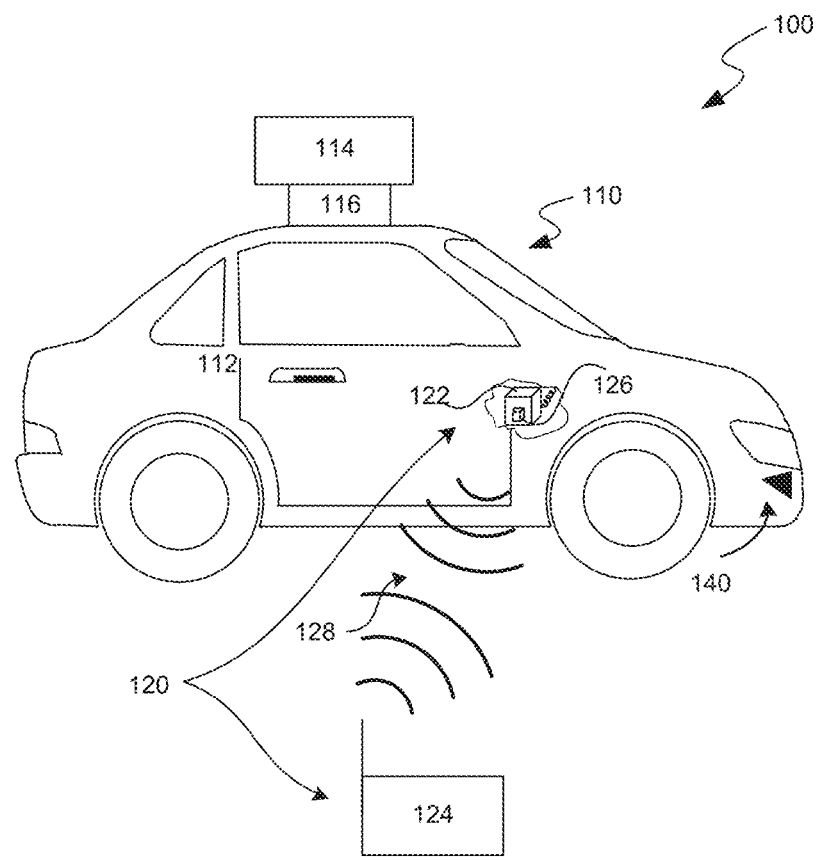
FIG. 1 is a schematic illustration of a representative system 100 having elements configured in accordance with some embodiments of the presently disclosed technology.

A vehicle equipped with Autonomous Driving or ADAS typically has sensors such as cameras, radars, or LiDAR sensors. Radars on the vehicle can provide distance information of moving or fixed objects within a proximity of the vehicle. LiDAR sensors on the vehicle can typically provide more precise three-dimensional information of surrounding objects. With the development of Machine Learning and Computer Vision technologies, the cameras on the vehicles can provide not only images they obtained but more depth information of the images. For example, a stereo camera on the vehicle (e.g., in the front of the vehicle) can obtain a depth map depicting the environment in front of the vehicle, which provides distance information of objects in front of the vehicle. However, the degree of precision associated with a depth map can depend on texture information of the objects. Some objects, such as glass, water surface, sky, or the like, may lack texture information, which can result in an incorrect depth determination by the stereo camera system. For example, while a vehicle drives along a highway, the stereo camera placed in the front of the vehicle may obtain images including sky in front of the vehicle. The stereo camera may calculate incorrect depth information of the sky area (e.g., estimating a distance of 50 m, 75 m, 100 m, or other values to the sky area) and influence the outcome of other applications (e.g., global computing of images obtained).

As discussed, environment detection (e.g., detection of the distance to various objects) is an important aspect of automated and/or unmanned navigation technologies. Image data collected by sensors (e.g., cameras) carried by a mobile platform (e.g., an unmanned car, watercraft, or aircraft) can be used as a basis for detecting an environment that surrounds or is otherwise observable from the mobile platform.

Stereo vision systems (e.g., stereo cameras) typically rely on the texture richness of objects in a scene to calculate depth (distance) information. However, in certain cases, certain interfering features (e.g., the sky) may lack texture and the changes in lighting associated with such features can be relatively frequent and/or dramatic. Therefore, depth calculation with respect to such interfering features can be difficult and/or inaccurate. For example, while the true depth value to the sky should be infinity, due to changes in sunlight and/or clouds, stereo vision systems may determine that the distance to certain parts of the sky is 100 meters or other distances and thus provide an inaccurate basis for navigation.

Stereo vision systems typically require the use of Global Shutter, which is more complex and expensive than regular Rolling Shutters. Due to cost constraints, stereo vision systems typically use Global Shutter cameras with a limited dynamic range. Moreover, in order to improve the sharpness of captured images, stereo vision systems typically only generate grayscale images.

Computer vision systems (e.g., monocular camera) are often used to identify objects in a scene, e.g., deriving or disentangling of symbolic information from image data using models constructed with the aid of geometry, physics, statistics, and learning theory. For example, a monocular camera coupled to a vehicle can identify sky, trees, traffic signs, other vehicles, pedestrians or other objects surrounding the vehicle. Computer vision systems can use suitable Machine Learning techniques such as Artificial Neural Network (ANN) to identify the objects. For example, computer vision systems can identify an object via its shape, color or other characteristics based on one or more layers of ANN that have been trained.

Computer vision systems typically require the use of color camera(s) to obtain color information of the image. Camera(s) with Rolling Shutter are often used for computer vision systems, for its lower cost, higher functionality and/or other reasons.

In some embodiments, the presently disclosed technology can use at least a color camera (e.g., a main camera of a mobile platform) to obtain images depicting the environment. Typically, the main camera is a color camera which can be advantageous in detecting interfering features. The color camera can have a larger dynamic range and higher resolution. The color camera can work with rolling shutter. The presently disclosed technology can also use at least a stereo camera (e.g., two cameras placed on a mobile platform) to obtain stereo image depicting the environment. The stereo camera can be grayscale cameras with global shutter, which can be advantageous in achieving high acutance of images at a low cost. The main camera and the stereo camera can be placed on the mobile platform near each other. For example, the main camera can be placed between the two cameras of stereo system, which are all set in the front of the mobile platform so that the main camera and the stereo camera can obtain images depicting approximately the same portion of environment in front of the mobile platform.

Illustratively, a camera can be used for capturing images to serve as a basis for detecting the sky, which can be further integrated with environment data generated by a stereo vision system. Accordingly, the mobile platform can identify portions of the environment having an infinite depth and avoid erroneous observations. Illustratively, the mobile platform can exclude interfering features from the auto exposure reference area of various cameras to further improve system performance. For example, by excluding the sky portion of image(s) and/or other sensor data from consideration during 3D environment mapping or modeling or during certain phases of obstacle detection, the stereo vision system and/or other depth sensing system are more likely to focus on local environment within a proximity of the mobile platform.

In accordance with various embodiments of the presently disclosed technology, a controller associated with the mobile platform can identify multiple regions from a color image obtained by a color vision sensor (e.g., a monocular color camera) carried by the mobile platform. The identified regions may or may not overlap with one another. The controller can employ various segmentation and/or clustering methods suitable for identifying the regions. In some embodiments, the entire color image is divided up into the regions based, for example, on edges detected in the color image.

These regions can be analyzed to determine which one(s) correspond to interfering features (e.g., the sky) in an environment surrounding the mobile platform. The controller can perform this analysis using non-image data obtained by one or more other sensors carried by the mobile platform. For example, an inertial measurement unit (IMU) carried by the mobile platform can provide information about the pose (e.g., orientation and location information) of the IMU, which the controller can use in combination with a relative positional relationship between the IMU and the color vision sensor to determine a horizon line on the color image.

The controller can then filter out a first subset of regions (which are not likely to correspond to any part of the sky) from the regions identified from the color image based on information (e.g., the horizon line) obtained from the non-image data. For example, the horizon line divides the color image into an upper portion and a lower portion, and the filtered-out first subset of regions can include any region in the color image that, at least in part, resides in the lower portion of the color image. The remaining regions constitute a revised set of regions, which can be further analyzed to determine which one(s) correspond to the sky.

The controller can determine a second subset of regions from the revised set of regions as corresponding to an interfering feature (e.g., the sky) based on color information or other image information (e.g., semantic information) associated with the revised set of regions, since in some cases, the color associated with the interfering feature conforms to a particular type of color distribution. Illustratively, determining the second region subset can be based on a measure of gradient calculated for each region using color values. In some cases, the regions in the second subset are connected with one another. In some embodiments, various suitable machine learning techniques (e.g., support vector machine or artificial neural network) can be used to determine the second region subset.

The controller can then transform data (e.g., location, boundaries, or the like) corresponding to the second region subset into detecting data obtained by a third sensor carried by the mobile platform. The third sensor (e.g., a stereo camera) may produce three-dimensional (3D) sensor data which the mobile platform typically uses for environment mapping, obstacle detection, automated navigation, or other functions. Informed by the data corresponding to the second region subset, in certain stages of the environment mapping, obstacle detection, automated navigation, or the like, the controller can exclude sensor data produced by the third sensor that correspond to the interfering feature(s) from consideration, thereby improving system efficiency and performance. Alternatively or in addition, the controller can direct the third sensor to skip sensing certain part(s) of the environment that correspond to the second region subset, thereby achieving improvement in power consumption.

In some embodiments, one or more sensors carried by a mobile platform are used for environment sensing. A controller of the mobile platform can identify a plurality of regions from a color image obtained by a color vision sensor (e.g., color camera) carried by the mobile platform. The controller can filter out a first subset of regions from the plurality of regions to generate a revised set of regions based on non-image data (e.g., pose information) obtained by a second sensor (e.g., IMU) carried by the mobile platform. The controller can further determine a second region subset of regions from the revised set of regions as corresponding to an interfering feature (e.g., the sky), based, at least in part, on color information (e.g., a particular color distribution centered around a specific color value) associated with the revised set of regions. Accordingly, the controller can perform environment detection based, at least in part, on the second region subset of regions (e.g., by skipping the sky portion of the environment during certain phases of environment detection).

In some embodiments, a non-transitory computer-readable medium (e.g., computer memory or data storage device associated with a controller of a mobile platform) storing computer-executable instructions that, when executed, can cause one or more processors associated with the mobile platform to perform actions. The actions can include selecting a target portion (a portion of the image above a determined horizon line) from a color image obtained by a color vision sensor (e.g., color camera) carried by the mobile platform based, at least in part, on non-image data (e.g., pose information) obtained by a second sensor (e.g., IMU) carried by the mobile platform. The actions can also include identifying a plurality of regions from the target portion of the color image and determining a region subset from the plurality of regions as corresponding to an interfering feature (e.g., the sky), based, at least in part, on color information (e.g., color value based gradient) associated with the plurality of regions. The actions can further include performing environment detection based, at least in part, on the determined region subset.

In some embodiments, one or more sensors carried by a mobile platform can be used for environment sensing using.

A controller of the mobile platform can identify a plurality of regions from a color image obtained by a color vision sensor carried (e.g., color camera) by the mobile platform and determine a subset of regions from the set of regions as corresponding to an interfering feature (e.g., the sky), based, at least in part, on color information associated with the set of regions. The controller can transform data (e.g., boundaries, coordinates, or the like) corresponding to the subset of regions to integrate with non-color environment data (e.g., stereo image data or point cloud data) obtained from another sensor (e.g., a stereo camera system, LiDAR, radar, or the like) carried by the mobile platform, and perform environment detection based thereon.

In an example embodiment, an autonomous vehicle carries a color camera unit (e.g., a main camera of the vehicle) and an inertial measurement unit (IMU). A controller associated with the autonomous vehicle can segment a two-dimensional (2D) color image obtained by the color camera unit into a plurality of regions. Illustratively, the color image is captured in real time and depicts at least a portion of an environment surrounding the autonomous vehicle.

Segmenting (or otherwise dividing) the color image into the plurality of regions can be achieved in various ways that are suitable for purposes of identifying interfering feature(s) (e.g., the sky). The entire color image can be segmented (or otherwise divided) and individual regions may or may not overlap with one another. In some cases, at least some of the regions at least partially overlap with one another.

Illustratively, one or more edge detection methods can be applied to the color image to segment the image into the plurality of regions. For example, the controller can apply a Canny operator to detect and join edges, and segment the image into the plurality of regions using the detected edge lines. Alternatively or in addition, edge detection based segmenting can be achieved based on Roberts cross, Sobel, and/or Prewitt methods.

The controller can determine an indication of the horizon relative to the color image based, at least in part, on sensor data obtained from the IMU. The indication of the horizon (e.g., a determined horizon line) can serve as a reference for identifying candidate regions that may or may not correspond to interfering feature(s) (e.g., the sky). In some cases, the determining of the indication of the horizon can be performed after, prior to, or in parallel (at least partially) with the segmenting (or otherwise dividing) of the color image. In certain cases where the horizon indication determining is completed first, segmentation of the entire color image may not be needed. For example, the controller can segment (or otherwise divide) only the portion above a determined horizon line in the color image, as the sky should not be located below the determined horizon line.

Illustratively, determining the indication of the horizon can be achieved based on pose information obtained from the IMU. The relative position and/or orientation between the IMU and the color camera unit can be fixed or changeable, and various relative rotation angles between the two can be obtained. Based on the pose information obtained from the IMU and the rotation angles, the controller can determine a straight-line equation for the horizon line in accordance with a coordinate system of the color image.

The controller can further filter out a first subset of regions from the plurality of regions based, at least in part, on the indication of the horizon (e.g., the determined horizon line on the color image) to generate a reduced set of regions. The filtered first subset of regions includes regions that do not (or are unlikely to) represent any portion of interfering feature(s) (e.g., the sky), in accordance with the horizon indication.

Illustratively, filtering out the first region subset includes determining a relationship between an interfering feature (e.g., the sky) and a portion of the color image. For example, the relationship can be defined by the determined horizon line relative to the color image. In this case, the controller can filter out the regions that reside, in their entireties or in part, in the portion of the color image below the horizon line. The remaining regions can constitute the reduced set of regions.

Next, the controller can identify a second subset of regions from the reduced set of regions as corresponding to the sky, based, at least in part, on color information associated with the reduced set of regions. The second subset of regions can represent the interfering feature(s) (e.g., the sky). Illustratively, color associated with the interfering feature conforms to a particular type of color distribution. Accordingly, for the reduced set of regions, illustratively, the controller can determine which one(s) correspond to the interfering feature(s) (e.g., the sky) by using statistical information of color spaces (e.g., RGB or HSV spaces) and/or color-based gradients. In some cases, all the regions in the second regions subset are connected with one another.

The controller can further transform the identified second subset of regions into a reference system of a stereo camera unit carried by the autonomous vehicle. Illustratively, transforming or converting the identified second subset of regions can be achieved via a pinhole camera model or other applicable models. In accordance with the pinhole camera model, a camera matrix is used to denote a projective mapping from a 3D world coordinate system to a 2D image coordinate system. Based on the pinhole camera model, the controller can project the second subset of regions from (a) the image coordinate system associated with the color camera to (b) the image coordinate system associated with at least one camera of the stereo camera unit, by using respective camera calibration matrices and the rotation between the two cameras.

As guided by the second subset of regions after proper data transformation or conversion, the controller or the stereo camera unit can filter out data corresponding to the interfering feature(s) (e.g., the sky) and associate proper depth value(s) (e.g., infinity) to the filtered-out area(s) or space(s). In some cases, transforming or converting the second subset of regions can also be used to filter environment data (e.g., depth data) obtained by other sensor(s) (e.g., LiDAR, RADAR) and/or direct applicable sensor(s) to selectively perform depth measurement (e.g., skip the scanning of interfering feature(s)).

The controller can perform environment detection using at least the stereo camera unit. Effectively detecting and filtering out interfering feature(s), such as the sky, can enhance the reliability of depth information calculations and can improve system efficiency by eliminating or reducing unnecessary operations. For example, the controller can cause construction of a more focused 3D environment model, prioritize obstacle detection in portions of the environment that are within a certain proximity of the mobile platform, and/or ignore "background" features that are far away (e.g., considered to be at an infinite distance from the mobile platform). In some embodiments, the controller is a device (e.g., as a stand-alone single apparatus or as multiple physical parts communicatively connected with one another) carried by the mobile platform and includes one or more sensors (e.g., camera, IMU, or the like) used in accordance with the various methods disclosed herein.

Several details describing structures and/or processes that are well-known and often associated with mobile platforms (e.g., UAVs and/or other types of mobile platforms) and corresponding systems and subsystems, but that may unnecessarily obscure some significant aspects of the presently disclosed technology, are not set forth in the following description for purposes of clarity. Moreover, although the following disclosure sets forth several embodiments of different aspects of the presently disclosed technology, several other embodiments can have different configurations or different components than those described herein. Accordingly, the presently disclosed technology may have other embodiments with additional elements and/or without several of the elements described below with reference to FIGS. 1-10.

FIGS. 1-10 are provided to illustrate representative embodiments of the presently disclosed technology. Unless provided for otherwise, the drawings are not intended to limit the scope of the claims in the present application.

Many embodiments of the technology described below may take the form of computer- or controller-executable instructions, including routines executed by a programmable computer or controller. The programmable computer or controller may or may not reside on a corresponding mobile platform. For example, the programmable computer or controller can be an onboard computer of the mobile platform, or a separate but dedicated computer associated with the mobile platform, or part of a network or cloud-based computing service. Those skilled in the relevant art will appreciate that the technology can be practiced on computer or controller systems other than those shown and described below. The technology can be embodied in a special-purpose computer or data processor that is specifically programmed, configured or constructed to perform one or more of the computer-executable instructions described below. Accordingly, the terms "computer" and "controller" as generally used herein refer to any data processor and can include Internet appliances and handheld devices (including palm-top computers, wearable computers, cellular or mobile phones, multi-processor systems, processor-based or programmable consumer electronics, network computers, mini computers and the like). Information handled by these computers and controllers can be presented at any suitable display medium, including an LCD (liquid crystal display). Instructions for performing computer- or controller-executable tasks can be stored in or on any suitable computer-readable medium, including hardware, firmware or a combination of hardware and firmware. Instructions can be contained in any suitable memory device, including, for example, a flash drive, USB (universal serial bus) device, and/or other suitable medium. In particular embodiments, the instructions are accordingly non-transitory.

2. Representative Embodiments

FIG. 1 is a schematic illustration of a representative system 100 having elements configured in accordance with some embodiments of the presently disclosed technology. The system 100 includes a mobile platform 110 (e.g., an autonomous vehicle) and a control system 120. The mobile platform 110 can be any suitable type of movable object, such as an unmanned vehicle, an autonomous vehicle, or a robot, that can be used in various embodiments.

The mobile platform 110 can include a main body 112 that can carry a payload 114. Many different types of payloads can be used in accordance with the embodiments described herein. In some embodiments, the payload includes one or more sensors, such as an imaging device and/or an opto-electronic scanning device. For example, the payload 114 can include a stereo camera, a mono camera, a video camera, and/or a still camera. The camera can be a main camera (e.g., a camera used primarily for collecting images as its mission) of the mobile platform sensitive to wavelengths in any of a variety of suitable bands, including visual, ultraviolet, infrared and/or other bands. In some embodiments, the main camera is a color camera. The payload 114 can also include other types of sensors and/or other types of cargo (e.g., packages or other deliverables). In some embodiments, one or more payload-type sensors are also used to perform other functions (e.g., navigation).

In some embodiments, the payload 114 is supported relative to the main body 112 with a carrying mechanism 116 (e.g., a gimbal, rack, and/or crossbar). The carrying mechanism 116 can allow the payload 114 to be independently positioned relative to the main body 112.

The mobile platform 110 can be configured to receive control commands from the control system 120 and/or transmit data to the control system 120. In the embodiment shown in FIG. 1, the control system 120 includes some components carried on the mobile platform 110 and some components positioned off the mobile platform 110. For example, the control system 120 can include a first controller 122 carried by the mobile platform 110 and a second controller 124 (e.g., a human-operated, remote controller such as a remote car key or a smartphone running a controller app) positioned remote from the mobile platform 110 and connected via a communication link 128 (e.g., a wireless link such as a radio frequency (RF) based link, a Wi-Fi network, or a cellular network). The first controller 122 can include a computer-readable medium 126 that executes instructions directing the actions of the mobile platform 110, including, but not limited to, the mobile platform's motions and operation of the payload 114 (e.g., the main camera of the mobile platform 110). The second controller 124 can include one or more input/output devices, e.g., a display and control buttons. In some embodiments, the operator at least partly manipulates the second controller 124 to control the mobile platform 110 remotely, and receives feedback from the mobile platform 110 via the display and/or other interfaces on the second controller 124. In some embodiments, the mobile platform 110 operates autonomously, in which case the second controller 124 can be eliminated, or can be used solely for operator override functions.

In order to provide for safe and efficient operation, it may be beneficial for a mobile platform to be able to autonomously or semi-autonomously detect obstacles and/or to engage in evasive maneuvers to avoid obstacles. Additionally, sensing environmental objects can be useful for mobile platform functions such as navigation, target tracking, and mapping, particularly when the mobile platform is operating in a semi-autonomous or fully autonomous manner.

The mobile platforms described herein can include one or more sensors (e.g., separate and independent from payload-type sensors) configured to detect objects in the environment surrounding the mobile platform. In some embodiments, the mobile platform includes one or more sensors (e.g., distance measurement device 140 of FIG. 1) configured to measure the distance between an object and the mobile platform. The distance measurement device can be carried by the mobile platform in various ways, such as above, underneath, on the side(s) of, or within the main body of the mobile platform. Optionally, the distance measurement device can be coupled to the mobile platform via a gimbal or other carrying mechanism that permits the device to be translated and/or rotated relative to the mobile platform. In some embodiments, the distance measurement device can include an optical distance measurement device that uses light to measure distance to an object. In some embodiments, the distance measurement device is a stereo vision system that can provide stereo visual data, from which depth information can be determined. The stereo vision system can be stereo camera(s). In some embodiments, the distance measurement device can include a LiDAR system or a laser rangefinder.

Figure 2:
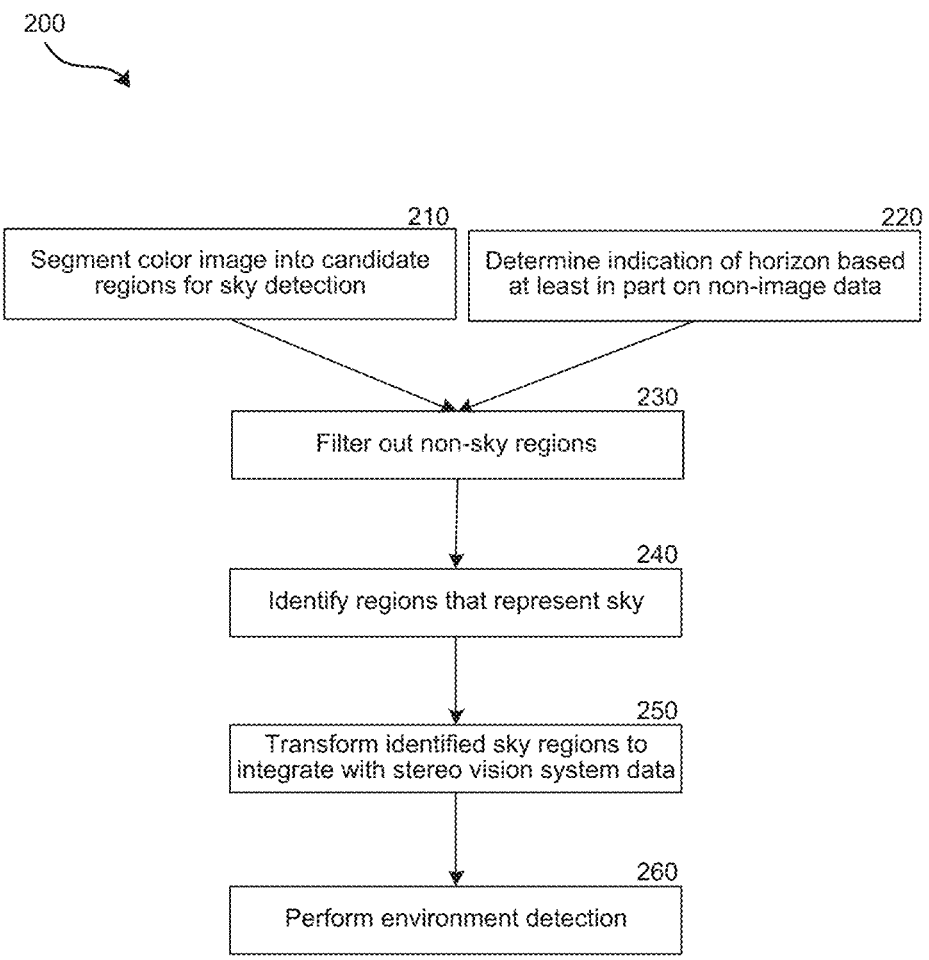
FIG. 2 is a flowchart illustrating a method that uses color image(s) to facilitate determining interfering feature(s) for environment detection, in accordance with some embodiments of the presently disclosed technology.

FIG. 2 is a flowchart illustrating a method 200 that uses image(s) to facilitate identifying interfering feature(s) (e.g., the sky) for environment detection, in accordance with some embodiments of the presently disclosed technology. The method 200 can be implemented by a controller (e.g., an onboard computer of a mobile platform, an associated computing device, and/or an associated computing service).

Figure 3:
FIG. 3 shows an example of a color image captured by a camera of a mobile platform, in accordance with some embodiments of the presently disclosed technology.

With reference to FIG. 2, at block 210, the method 200 includes segmenting (or otherwise dividing) an image into multiple candidate regions for sky detection. Illustratively, the image is a color image captured by a color vision sensor such as a camera (e.g., a monocular color camera) of the mobile platform in real time and indicates at least a portion of an environment observable from the mobile platform. FIG. 3 shows an example of an image captured by the camera, in accordance with some embodiments of the presently disclosed technology.

Segmenting (or otherwise dividing) the image into candidate regions can be achieved in various ways that are suitable for purposes of identifying interfering feature(s). In some embodiments, the entire image is segmented (or otherwise divided) into candidate regions. In some embodiments, individual candidate regions do not overlap with one another. In some embodiments, at least some of the individual regions at least partially overlap with one another.

Illustratively, one or more edge detection methods can be applied to the color image thereby dividing the image into multiple regions. For example, the controller can apply a Canny operator to find the edge points (e.g., pixels) as follows:

a) Smooth the image with one or more Gaussian filters;
b) Calculate gradient magnitudes and directions using first-order partial derivative finite difference techniques;
c) Perform non-maximal suppression of gradient magnitudes; and
d) Detect and join edges using a double threshold method by dynamically setting the low threshold so that the number of edge pixels is less than a value defined by the dimension of the image.

Figure 4:
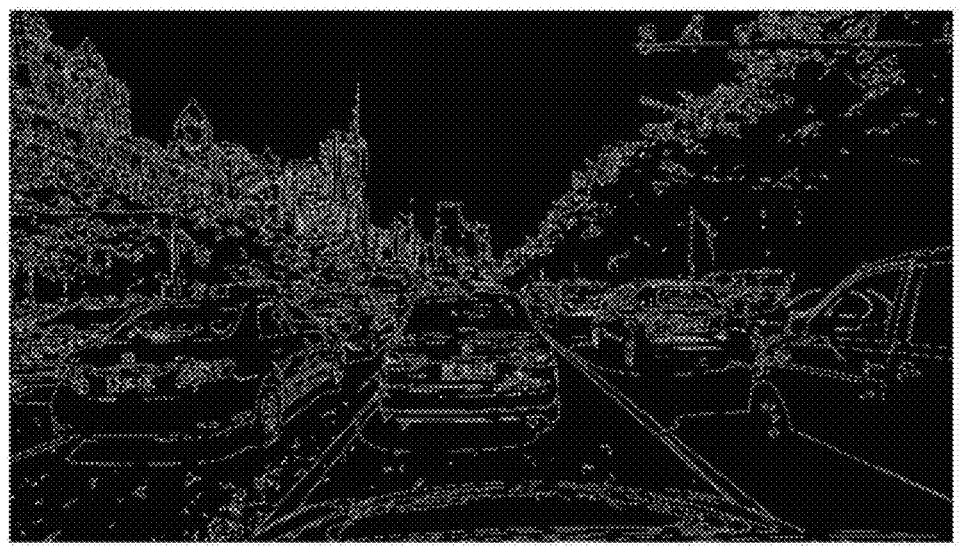
FIG. 4 shows an example of multiple candidate regions of a color image as separated by detected edge lines, in accordance with some embodiments of the presently disclosed technology.

FIG. 4 shows an example of multiple candidate regions of the image as separated by detected edge lines, in accordance with some embodiments of the presently disclosed technology. In various embodiments, edge detection based segmenting can also be achieved based on Roberts cross, Sobel, and/or Prewitt methods.

Referring back to FIG. 2, at block 220, the method 200 includes determining an indication of the horizon based, at least in part, on non-image sensor data. The indication of the horizon (e.g., a determined horizon line) can serve as a reference for identifying candidate regions that may or may not correspond to interfering feature(s) (e.g., the sky). In various embodiments, block 220 can be performed after, prior to, or in parallel (at least partially) with block 210. In certain embodiments where block 220 is completed prior to block 210, segmentation of the entire image may not be needed. For example, the controller can segment (or otherwise divide) only the portion above a determined horizon line in the image, as the sky should not be located below the determined horizon line.

Figure 5:
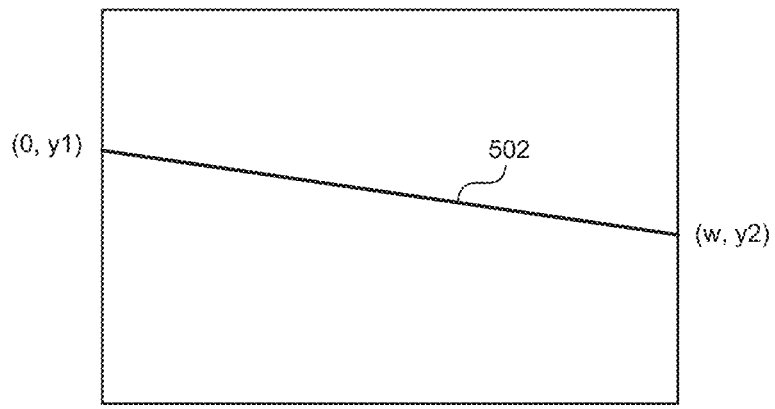
FIG. 5 illustrates an example method for determining a horizon line using data obtained from an IMU, in accordance with some embodiments of the presently disclosed technology.

Illustratively, determining the indication of the horizon can be achieved based on data obtained from a second sensor such as an Inertial Measurement Unit (IMU) carried by the mobile platform. The relative position and/or orientation between the second sensor and the color vision sensor can be fixed or changeable. As will be described in further detail later, FIG. 5 illustrates an example method for determining an indication of the horizon using data obtained from the second sensor (e.g., an IMU), in accordance with some embodiments of the presently disclosed technology. Illustratively, the controller can determine a straight line equation for the horizon line in accordance with a coordinate system of the image.

Referring back to FIG. 2, at block 230, the method 200 includes filtering out a first region subset including candidate regions that do not (or are unlikely to) represent any portion of interfering feature(s) (e.g., the sky) using the non-image data based indication obtained at block 220.

Figure 6:
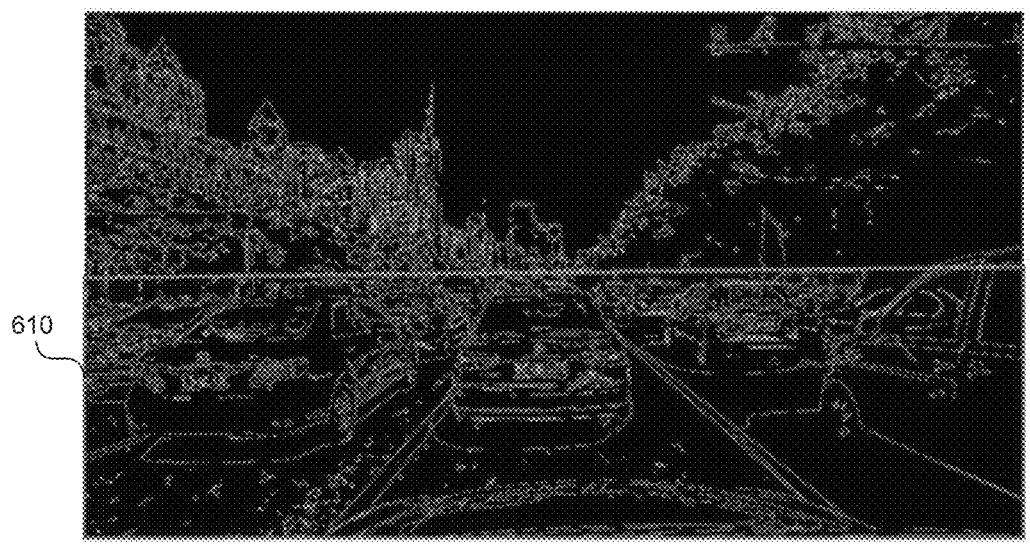
FIG. 6 shows a method for filtering out non-sky candidate regions using an estimated horizon line, in accordance with some embodiments of the presently disclosed technology.

FIG. 6 shows a method for filtering out the first region subset of non-sky candidate regions using an estimated horizon line, in accordance with some embodiments of the presently disclosed technology. Illustratively, filtering out the first region subset includes determining a relationship between an interfering feature (e.g., the interfering feature, such as the sky, is at least a threshold distance away from the mobile platform) and a portion of the color image. For example, the relationship is defined by the estimated horizon line relative to the color image. With reference to FIG. 6, the controller filters out all candidate regions, in their entireties, that reside in the portion of the color image below the horizon line, that is, all of the candidate regions that are inside exclusion polygon 610 are filtered out. In some embodiments, the portion of the color image at least partially overlaps with each region of the region subset to be filtered out. Illustratively, the controller can also filter out any candidate region that intersects with exclusion polygon 610.

Referring back to FIG. 2, at block 240, the method 200 includes identifying candidate regions that represent interfering feature(s) (e.g., the sky). Illustratively, color associated with the interfering feature conforms to a particular type of color distribution. Accordingly, for the remaining candidate regions that are not filtered out, illustratively, the controller can determine which candidate region(s) correspond to the interfering feature(s) (e.g., the sky) using statistical information of color spaces (e.g., RGB or HSV spaces) for individual candidate regions and/or gradients within individual candidate regions. The candidate regions that are determined to correspond to the interfering feature(s) constitute a second region subset. In some embodiments, the regions in the second regions subset are connected with one another.

Determining or identifying the second region subset can be achieved in various ways. For example, if the RGB values of a candidate region are concentrated in the "B" (blue) area, and/or if the brightness values in the HSV distribution of the candidate region is relatively high, then the candidate region can be identified as representing a portion of the sky. Illustratively, this result can be achieved by applying respective thresholds in RGB and/or HSV spaces or using statistical classifiers (e.g., support vector machines).

As another example, because the texture of the sky area is typically weak, gradients in RGB space and/or HSV space can be used to identify sky regions. Illustratively, if the average gradient for a candidate region is smaller than a threshold value, the controller can identify the candidate region as representing a portion of the sky. As yet another example, artificial neural network-based dense labeling can be used to identify sky regions.

Figure 7:
FIG. 7 illustrates a result generated from a candidate region identification process, in accordance with some embodiments of the presently disclosed technology.

With continued reference to FIG. 2, at block 250, the method 200 includes transforming or converting the identified second subset of regions that represent interfering feature(s) (e.g., the sky) to integrate with data obtained from the stereo vision system of the mobile platform. For example, FIG. 7 illustrates a result generated from the candidate region identification performed at block 240. The identified sky region(s) 720 (constituting the second region subset) are represented in white and all other regions are represented in black, e.g., in the form of a silhouette.

Illustratively, data corresponding to the second region subset can be transformed to integrate with data obtained by a third sensor (e.g., a stereo or mono camera, a LiDAR, a radar, or the like). In some embodiments, the third sensor can produce three-dimensional (3D) sensor data. Transforming or converting the identified regions can be achieved via a pinhole camera model or other applicable models. In accordance with the pinhole camera model, a camera matrix is used to denote a projective mapping from a 3D world coordinate system to a 2D image coordinate system:

$$z_c \begin{bmatrix} u \\ v \\ 1 \end{bmatrix} = K[RT] \begin{bmatrix} x_w \\ y_w \\ z_w \\ 1 \end{bmatrix}$$

wherein $$\begin{bmatrix} u \\ v \\ 1 \end{bmatrix}$$

represents a 2D point position in the image coordinate system, $$\begin{bmatrix} x_w \\ y_w \\ z_w \\ 1 \end{bmatrix}$$

represents a 3D point position in the world coordinate system. K is generally referred to as the camera calibration matrix, which contains 5 intrinsic parameters. As those skilled in the art would recognize, these parameters include focal length, image sensor format, and principal point. Matrix R is generally known as the Rotation Matrix, and matrix T is generally known as the Translation Matrix. R, T are the extrinsic parameters which denote the coordinate system transformations from the 3D world coordinate system to a 3D camera coordinate system.

Figures 2, 8A:
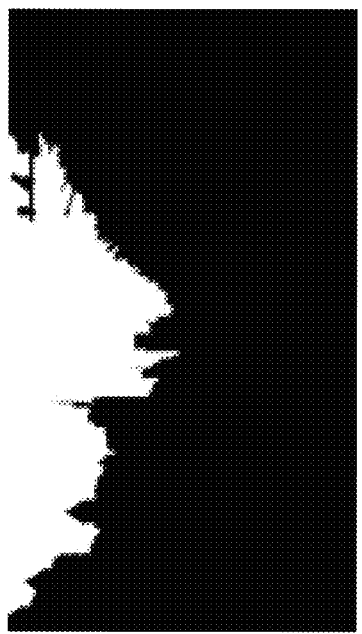
Figures 2, 8B:
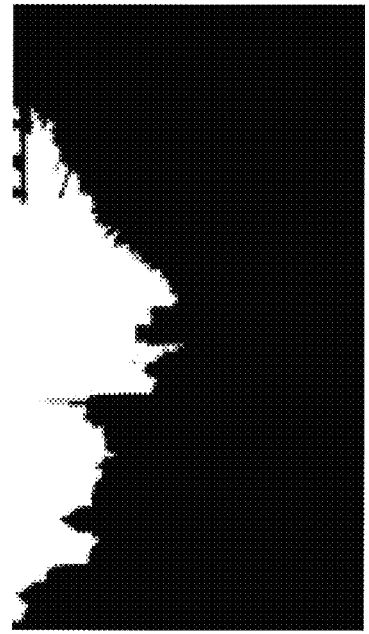
Figures 1, 8A:
Figures 1, 8B:
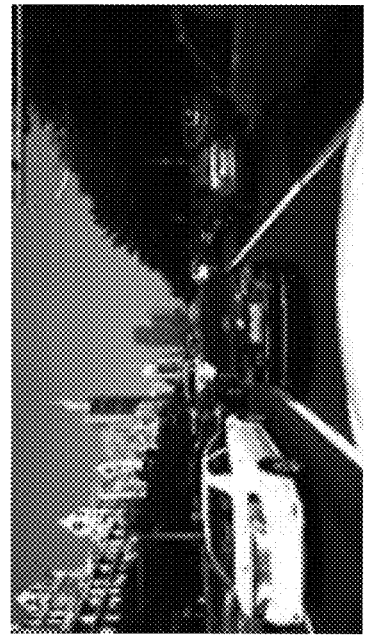

Illustratively, the controller can project the identified regions from (a) the image coordinate system associated with the camera that provided the basis for sky detection to (b) the image coordinate system associated with at least one camera of the stereo vision system, by using respective camera calibration matrices and the rotation between the two cameras. This process can ignore the translation between the two cameras because the sky is considered to be at an infinite distance from the cameras. For example, FIGS. 8A-1 and 8A-2 show an image obtained by a main camera and a corresponding silhouette image indicating sky regions identified from the image, and FIGS. 8B-1 and 8B-2 show a grayscale image obtained by a stereo vision system and a corresponding silhouette image indicating the sky regions projected onto the grayscale image coordinate system.

As guided by the identified regions after proper data transformation or conversion, the stereo vision system can filter out data corresponding to the interfering feature(s) (e.g., the sky) and associate proper depth value(s) (e.g., infinity) to the filtered-out area(s) or space(s). In some embodiments, the method 200 includes transforming or converting the identified regions to filter environment data (e.g., depth data) obtained by other sensor(s) (e.g., LiDAR, RADAR) and/or direct applicable sensor(s) to selectively perform depth measurement (e.g., skip the scanning of interfering feature(s)).

With reference to FIG. 2, at block 260, the method 200 includes performing environment detection based, at least in part, on an exclusion of data corresponding to the identified "interfering" regions. Effectively detecting and filtering out interfering feature(s), such as the sky, can enhance the reliability of depth information calculations and can improve system efficiency by eliminating or reducing unnecessary operations. For example, the controller can cause construction of a more focused 3D environment model, prioritize obstacle detection in portions of the environment that are within a certain proximity of the mobile platform, and/or ignore "background" features that are far away (e.g., considered to be at an infinite distance from the mobile platform).

As stated earlier, FIG. 5 illustrates an example method for determining a horizon line using data obtained from an IMU, in accordance with some embodiments of the presently disclosed technology.

With reference to FIG. 5, let the upper left corner of the image be the origin (0, 0) of a coordinate system associated with pixels of the image, w be the width (e.g., measured by pixels) of the image, and line 502 indicate the horizon relative to the image reference system. The controller can calculate y1 and y2, and then determine an equation of the line 502. A general straight line equation ax+by+c=0 can be used.

Illustratively, parameters for the equation can be calculated as follows:

$$\begin{cases} a = \tan\phi \\ b = 1 \\ c = -\tan\phi \cdot \frac{1}{2}w + \sin\phi \cdot \tan\phi - \frac{1}{2}h + \tan\theta \cdot f \cdot \cos\phi \end{cases}$$

where ϕ is a rotation angle around the z-axis, and θ is a rotation angle around the x-axis, both which are obtained based on the IMU data (e.g., pose information) and the relative positional relationship between the camera and the IMU carried by the mobile platform. Illustratively, w is the width of the image, h is the height of the image, and f is the focal length of the camera.

Figure 11:
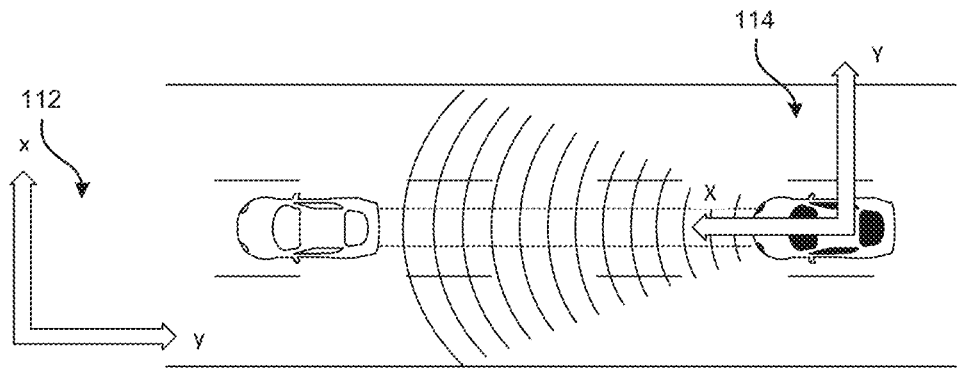
FIG. 11 illustrates an example world coordinate system and an example mobile platform coordinate system, in accordance with some embodiments of the presently disclosed technology.

More specifically, the process for determining the horizon line can be described with reference to FIGS. 11 to 16. FIG. 11 illustrates an example world coordinate system 112 and an example mobile platform coordinate system 114. The world coordinate system 112 includes x- and y-axes as shown and a z-axis pointing inward towards the center of the earth. Similarly, the mobile platform coordinate system 114 includes x- and y-axes as shown and a z-axis pointing inward towards the center of the earth.

Figure 12:
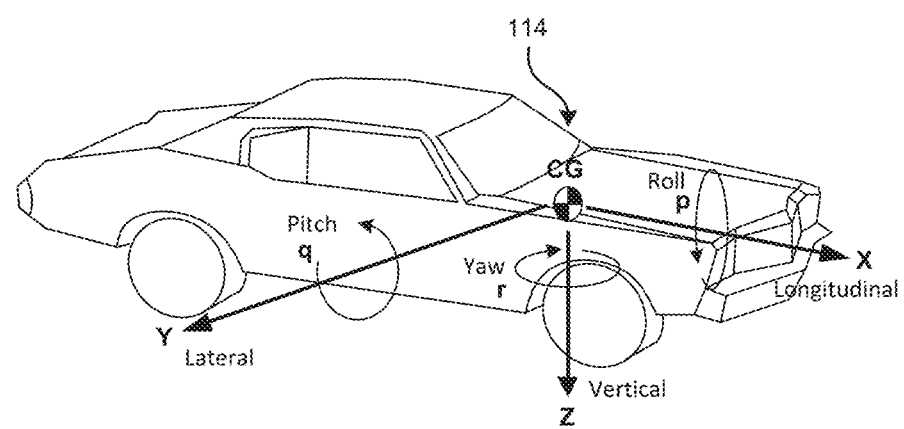
FIG. 12 illustrates another view of the mobile platform coordinate system as illustrated in FIG. 11.
Figure 13:
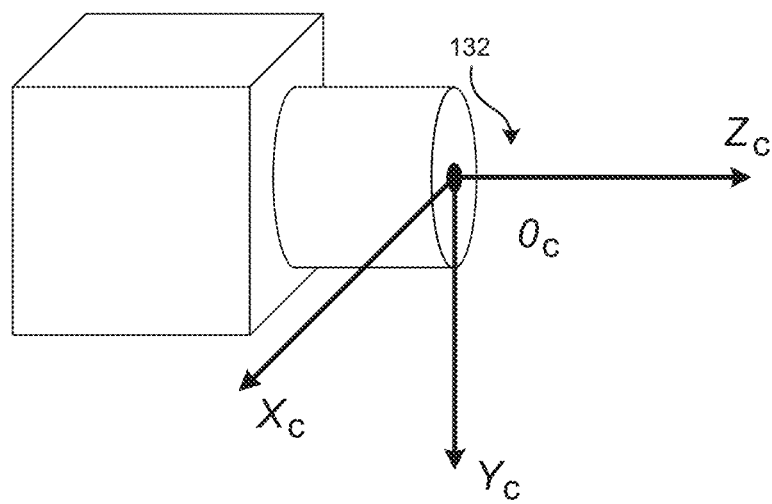
FIG. 13 illustrates an example camera coordinate system, in accordance with some embodiments of the presently disclosed technology.
Figure 14:
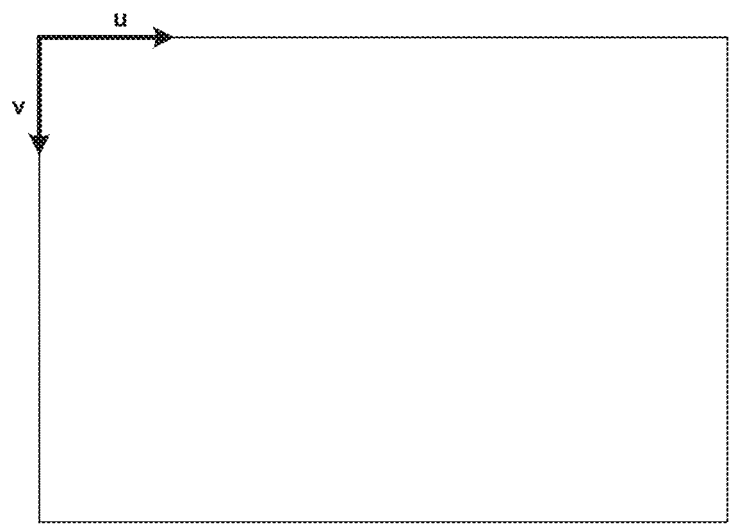
FIG. 14 illustrates an example image pixel coordinate system, in accordance with some embodiments of the presently disclosed technology.
Figure 15:
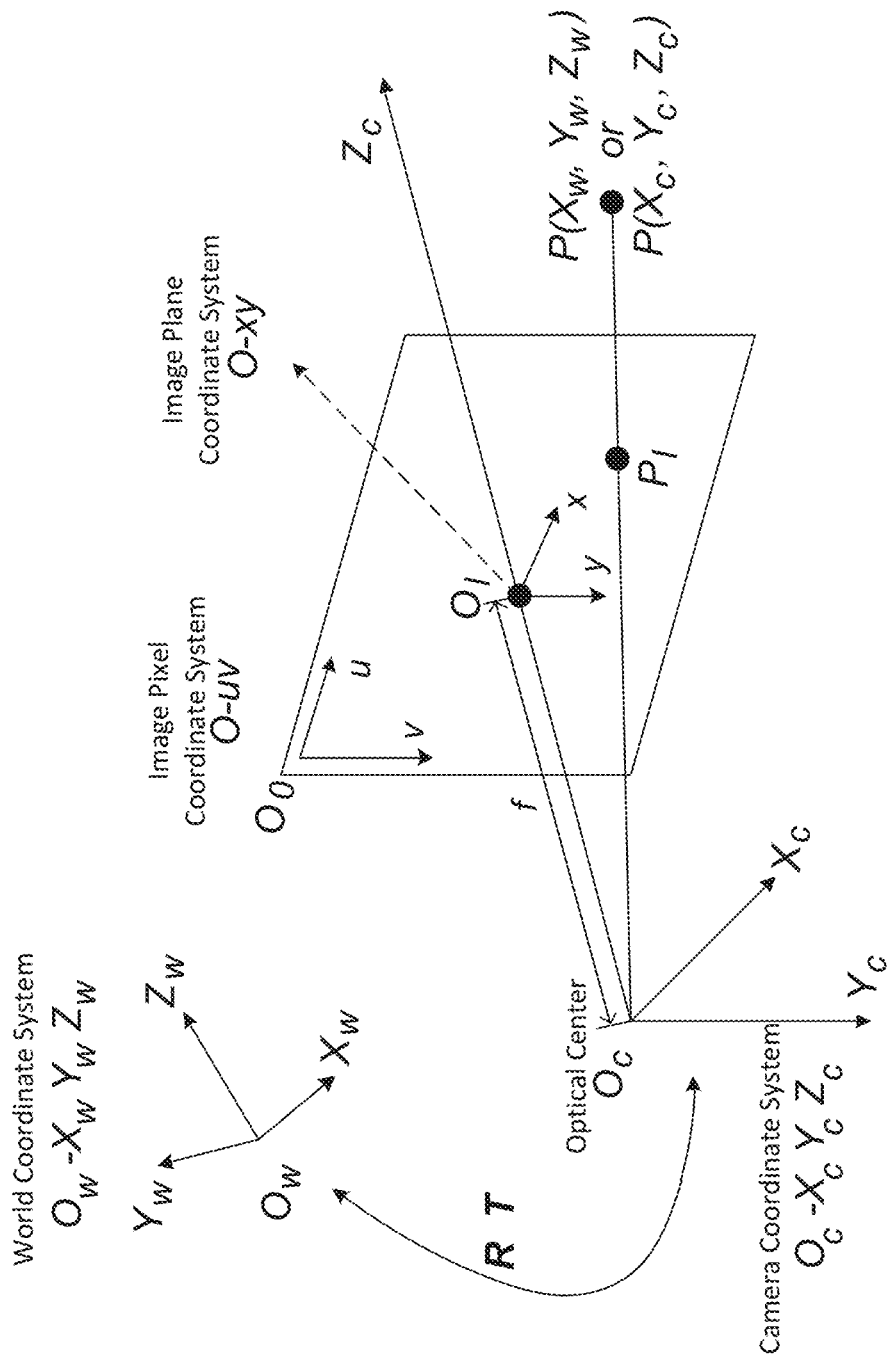
FIG. 15 illustrates the transformation relationships among several coordinate systems, in accordance with some embodiments of the presently disclosed technology.

FIG. 12 illustrates another view of the mobile platform coordinate system 114. With reference to FIG. 12, respective rotational directions (i.e., Roll, Pitch, and Yaw) about the x-, y-, and z-axes are illustrated. FIG. 13 illustrates an example camera coordinate system 132 with Xc, Yc, and Zc axes. FIG. 14 illustrates an example image pixel coordinate system with u- and v-axes. FIG. 15 illustrates the transformation relationships among several coordinate systems including the world coordinate system illustrated in FIG. 11, the camera coordinate system illustrated in FIG. 13, an image plane coordinate system, and the image pixel coordinate system illustrated in FIG. 14. These transformations are consistent with the pinhole camera model described above.

Figure 16:
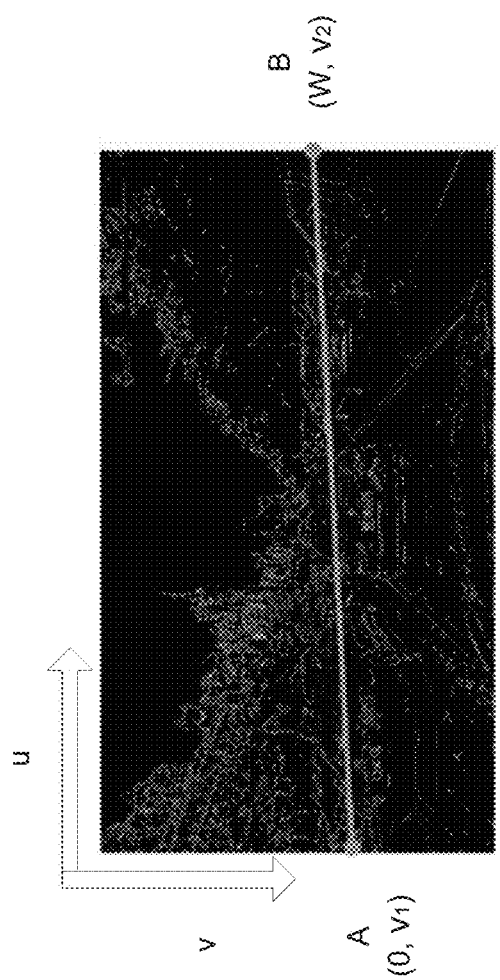
FIG. 16 illustrates an example horizon line computing process, in accordance with some embodiments of the presently disclosed technology.

Based on the coordinate system transformations, an example horizon line computating process can be described with reference to FIG. 16. To express the horizon in a straight line in the image pixel coordinate system, the controller can identify two endpoints A and B in the image pixel coordinate system as shown in FIG. 16. Because the line connecting A and B represents the horizon, endpoints A and B correspond to two 3D points with z=0 (i.e., having a height of zero) in the world coordinate system. In accordance with the pinhole camera model described above:

$$z_c \begin{bmatrix} u \\ v \\ 1 \end{bmatrix} = K[RT] \begin{bmatrix} x_w \\ y_w \\ z_w \\ 1 \end{bmatrix}$$

the controller can use a 3×4 matrix $M_{3\times4}$ to represent a result calculated from K, R, T as follows:

$$M_{3\times4} = \begin{bmatrix} m_{11} & m_{12} & m_{13} & m_{14} \\ m_{21} & m_{22} & m_{23} & m_{24} \\ m_{31} & m_{32} & m_{33} & m_{34} \end{bmatrix} = K \begin{bmatrix} R & T \\ 0 & 1 \end{bmatrix}$$

In accordance with the pinhole camera model, R represents the rotation from the world coordinate system to the camera coordinate system. R can be computed as a product of Rcv and Rvw (i.e., Rcv·Rvw), where Rcv represents the rotation from the mobile platform coordinate system to the camera coordinate system (which can be obtained, e.g., from calibration parameters predetermined with factory installation calibration) and Rvw represents the rotation from the world coordinate system to the mobile platform coordinate system (which can be obtained, e.g., from IMU data). T can also be obtained, e.g., from calibration parameters predetermined with factory installation and K can be obtained from camera internal calibration parameters. Because K, R, T can all be predetermined or known, the controller can compute the matrix $M_{3\times4}$.

With respect to endpoint A, these two equations hold true: u=0, $z_1$=0. Using the pinhole camera model, the following can be derived:

$$\begin{bmatrix} 0 \\ v_1 \\ 1 \end{bmatrix} = \begin{bmatrix} m_{11} & m_{12} & m_{13} & m_{14} \\ m_{21} & m_{22} & m_{23} & m_{24} \\ m_{31} & m_{32} & m_{33} & m_{34} \end{bmatrix} \begin{bmatrix} x_1 \\ y_1 \\ 0 \\ 1 \end{bmatrix} \rightarrow \begin{cases} m_{11}x_1 + m_{12}y_1 + m_{14} = 0 \\ m_{21}x_1 + m_{22}y_1 + m_{24} = v_1 \\ m_{31}x_1 + m_{32}y_1 + m_{34} = 1 \end{cases}$$

With respect to endpoint B, these two equations hold true: u=w, $z_2$=0, where W is the width of the image. Using the pinhole camera model, the following can be derived:

$$\begin{bmatrix} W \\ v_2 \\ 1 \end{bmatrix} = \begin{bmatrix} m_{11} & m_{12} & m_{13} & m_{14} \\ m_{21} & m_{22} & m_{23} & m_{24} \\ m_{31} & m_{32} & m_{33} & m_{34} \end{bmatrix} \begin{bmatrix} x_2 \\ y_2 \\ 0 \\ 1 \end{bmatrix} \rightarrow \begin{cases} m_{11}x_2 + m_{12}y_2 + m_{14} = w \\ m_{21}x_2 + m_{22}y_2 + m_{24} = v_2 \\ m_{31}x_2 + m_{32}y_2 + m_{34} = 1 \end{cases}$$

Based on the above, the controller can compute the values of $v_1$ and $v_2$. The controller can then apply the following straight line equation:

$$\frac{x-0}{w-0} = \frac{y-v_1}{v_2-v_1}$$

Accordingly, the controller can generate a final form of the straight line equation as:

ax+by+c=0 where:

$$\begin{cases} a = \tan\phi \\ b = 1 \\ c = -\tan\phi \cdot \frac{1}{2}w + \sin\phi \cdot \tan\phi - \frac{1}{2}h + \tan\theta \cdot f \cdot \cos\phi \end{cases}$$

For the above parameters, $\phi$ is a rotation angle around the z-axis, and $\theta$ is a rotation angle around the x-axis, both which can be obtained based on the IMU data (e.g., pose information) and the relative positional relationship between the camera and the IMU carried by the mobile platform. Illustratively, w is the width of the image, h is the height of the image, and f is the focal length of the camera.

Figure 9:
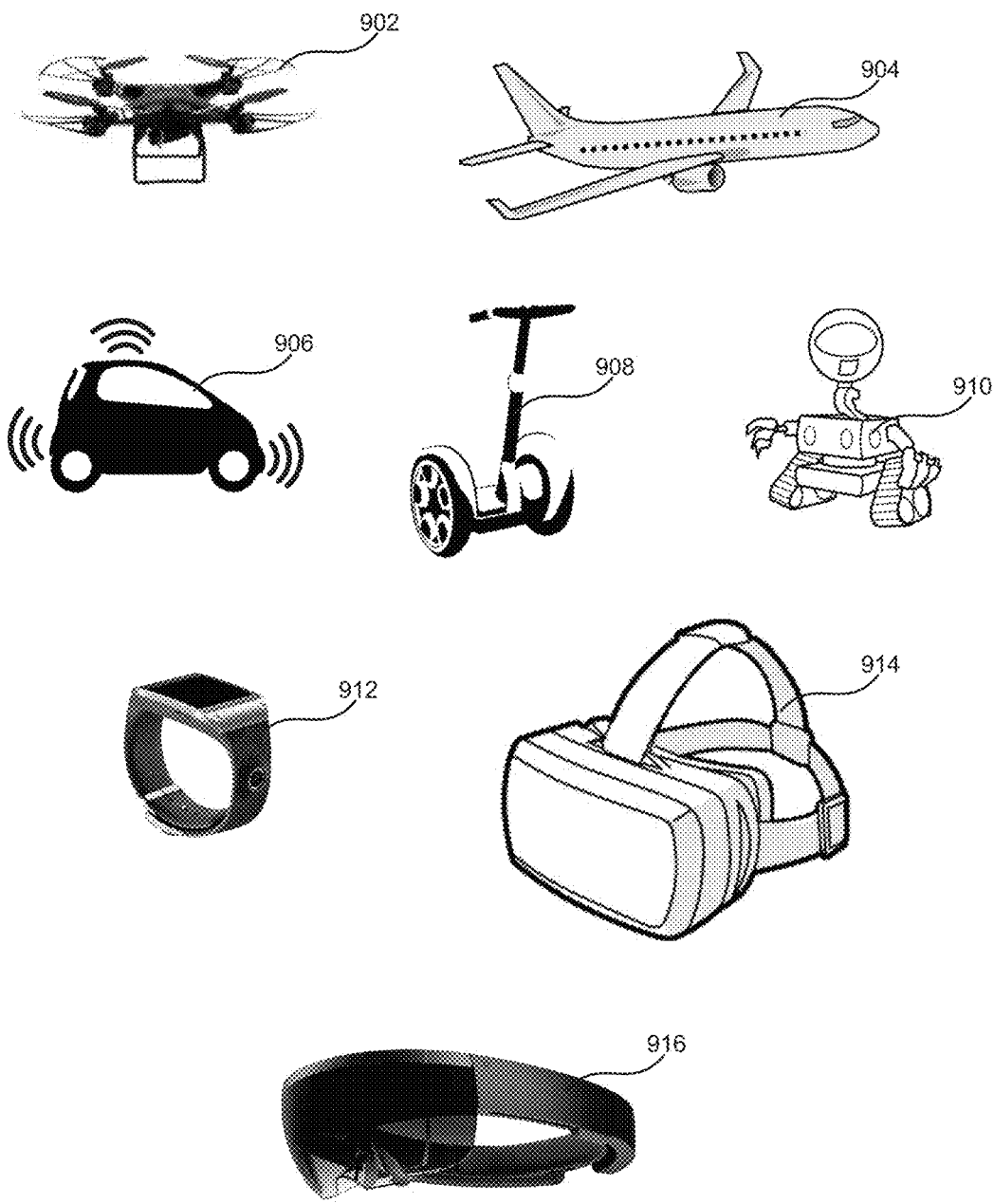
FIG. 9 illustrates examples of mobile platforms configured in accordance with various embodiments of the presently disclosed technology.

FIG. 9 illustrates examples of mobile platforms configured in accordance with various embodiments of the presently disclosed technology. As illustrated, a representative mobile platform as disclosed herein may include at least one of an unmanned aerial vehicle (UAV) 902, a manned aircraft 904, an autonomous vehicle 906, a self-balancing vehicle 908, a terrestrial robot 910, a smart wearable device 912, a virtual reality (VR) head-mounted display 914, or an augmented reality (AR) head-mounted display 916.

Figure 10:
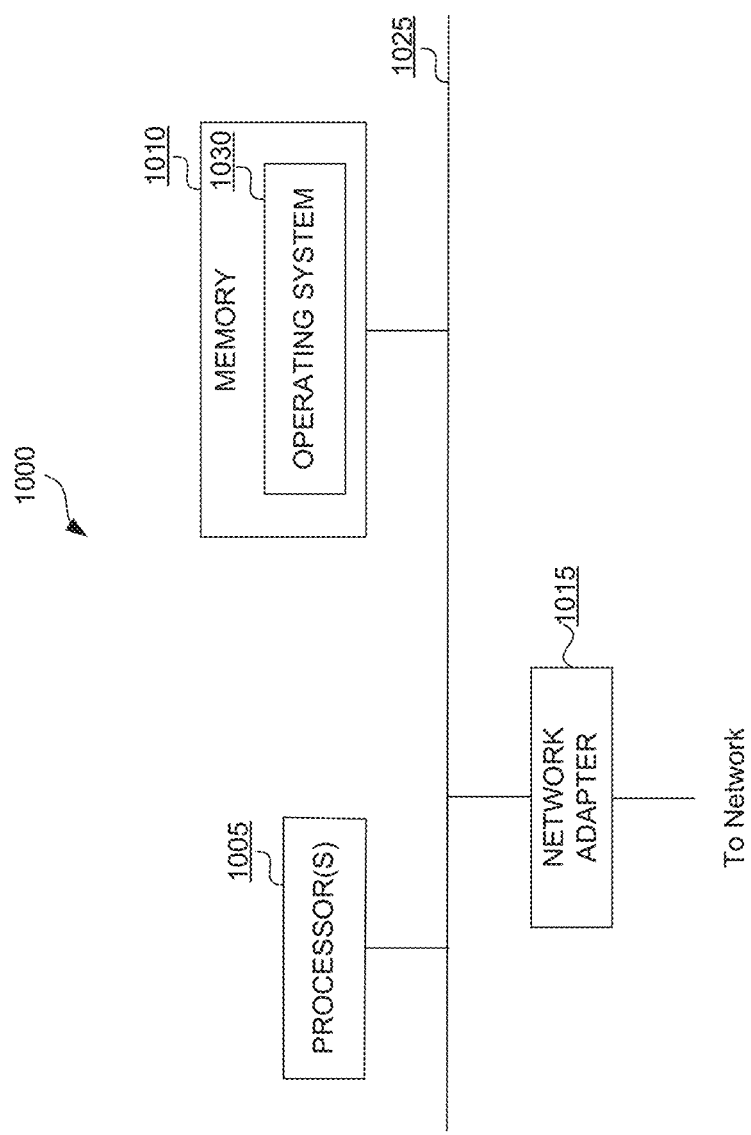
FIG. 10 is a block diagram illustrating an example of the architecture for a computer system or other control device that can be utilized to implement various portions of the presently disclosed technology.

FIG. 10 is a block diagram illustrating an example of the architecture for a computer system or other control device 1000 that can be utilized to implement various portions of the presently disclosed technology. In FIG. 10, the computer system 1000 includes one or more processors 1005 and memory 1010 connected via an interconnect 1025. The interconnect 1025 may represent one or more separate physical buses, point to point connections, or both, connected by appropriate bridges, adapters, and/or controllers. The interconnect 1025, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 1005 may include central processing units (CPUs) to control the overall operation of, for example, the host computer. In certain embodiments, the processor(s) 1005 accomplish this by executing software or firmware stored in memory 1010. The processor(s) 1005 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 1010 can be or include the main memory of the computer system. The memory 1010 represents any suitable form of random access memory (RAM), read-only memory (ROM), flash memory, or the like, or a combination of such devices. The memory 1010 can include operating system 1030. In use, the memory 1010 may contain, among other things, a set of machine instructions which, when executed by processor 1005, causes the processor 1005 to perform operations to implement embodiments of the presently disclosed technology.

Also connected to the processor(s) 1005 through the interconnect 1025 is a (optional) network adapter 1015. The network adapter 1015 provides the computer system 1000 with the ability to communicate with remote devices, such as the storage clients, and/or other storage servers, and may be, for example, an Ethernet adapter or Fiber Channel adapter.

The techniques described herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and/or steps in addition to or in place of what is described above. These potential additions and replacements are described throughout the rest of the specification. Reference in this specification to "various embodiments," "certain embodiments," or "some embodiments" means that a particular feature, structure, or characteristic described in connection with the embodiment is included in at least one embodiment of the disclosure. These embodiments, even alternative embodiments (e.g., referenced as "other embodiments") are not mutually exclusive of other embodiments. Moreover, various features are described which may be exhibited by some embodiments and not by others. Similarly, various requirements are described which may be requirements for some embodiments but not other embodiments. For example, some embodiments uses depth information generated from stereo camera(s), while other embodiments can use depth information generated from LiDAR(s), 3D-ToF, or RGB-D. Still further embodiments can use depth information generated from a combination of sensors. As used herein, the phrase "and/or" as in "A and/or B" refers to A alone, B alone, and both A and B.

To the extent any materials incorporated by reference herein conflict with the present disclosure, the present disclosure controls.

We claim:

1. A computer-implemented method for detecting sky using a camera unit and an inertial measurement unit (IMU), both carried by a common autonomous vehicle, the method comprising:
   segmenting a two-dimensional (2D) color image obtained by the camera unit into a plurality of regions, wherein the color image depicts at least a portion of an environment surrounding the autonomous vehicle;
   determining an indication of the horizon relative to the color image based, at least in part, on sensory data obtained from the IMU;
   filtering out a first subset of the regions based, at least in part, on the indication of the horizon to generate a reduced set of regions;
   identifying a second subset of regions from the reduced set of regions as corresponding to the sky, based, at least in part, on color information associated with the reduced set of regions, wherein the areas above the horizon line are candidate regions, and statistical information of color-based gradients is used to determine which candidate regions constitute the second subset of regions;
   transforming the identified second subset of regions into a reference system of a stereo camera unit, undistorting the data obtained by the stereo camera unit before transforming data corresponding to the identified second subset of regions; and
   performing environment detection using at least the stereo camera unit based, at least in part, on exclusion of data corresponding to the second subset of regions, such that the stereo camera unit skips sensing certain parts of the environment.

2. A computer-implemented method for environment sensing using one or more sensors carried by a mobile platform, comprising:
   identifying a plurality of regions from an image obtained by a vision sensor carried by the mobile platform;
   determining a subset of regions from the plurality of regions as corresponding to an interfering feature, wherein at least one of the identifying the plurality of regions or the determining the subset of regions is based, at least in part, on non-image data obtained by a second sensor carried by the mobile platform; and
   performing environment detection based, at least in part, on exclusion of data corresponding to the subset of regions, such that a stereo camera skips sensing certain parts of the environment;
   transforming data corresponding to the subset of regions to integrate with data obtained by the stereo camera;
   undistorting the data obtained by the stereo camera before transforming data corresponding to the subset of regions,
   wherein determining the subset of regions is based, at least in part, on a measurement of gradient, and the measurement of gradient is calculated based, at least in part, on color values.

3. The method of claim 2, wherein individual regions of the plurality of regions do not overlap with one another.

4. The method of claim 2, wherein the entire image is divided into the plurality of regions.

5. The method of claim 2, wherein identifying the plurality of regions comprises:
    selecting a target portion from the image based, at least in part, on the non-image data obtained by the second sensor; and
    identifying the plurality of regions from the target portion of the image.

6. The method of claim 5, wherein selecting the target portion from the image comprises determining a line relative to the image based, at least in part, on the non-image data.

7. The method of claim 6, wherein the target portion of the image resides on one side of the line.

8. The method of claim 2, wherein identifying the plurality of regions is based, at least in part, on edge detection.

9. The method of claim 2, wherein the vision sensor includes a monocular color camera.

10. The method of claim 2, wherein the second sensor includes an inertial measurement unit (IMU).

11. The method of claim 2, wherein a relative position and/or orientation between the second sensor and the vision sensor is fixed.

12. The method of claim 2, wherein determining the subset of regions from the plurality of regions as corresponding to an interfering feature further comprises filtering out another subset of regions based, at least in part, on a spatial relationship between the interfering feature and a portion of the image.

13. The method of claim 2, wherein the interfering feature is at least a threshold distance away from the mobile platform.

14. The method of claim 13, wherein the interfering feature corresponds to the sky.

15. The method of claim 13, wherein color associated with the interfering feature conforms to a particular type of color distribution.

16. The method of claim 2, wherein the stereo camera produces three-dimensional (3D) sensor data.

17. The method of claim 2, wherein performing environment detection is further based on data obtained by the stereo camera.

* * * * *